(12) United States Patent
Song et al.

(10) Patent No.: US 12,390,879 B2
(45) Date of Patent: Aug. 19, 2025

(54) DUAL TYPE ULTRASONIC BONDING APPARATUS AND BONDING METHOD USING THE SAME

(71) Applicant: WITS Co., Ltd., Yongin-si (KR)

(72) Inventors: Du Hyun Song, Suwon-si (KR); Chun Su Yoon, Suwon-si (KR)

(73) Assignee: WITS CO., LTD., Gyeonggi-Do (KR)

( * ) Notice: Subject to any disclaimer, the term of this patent is extended or adjusted under 35 U.S.C. 154(b) by 132 days.

(21) Appl. No.: 18/185,604

(22) Filed: Mar. 17, 2023

(65) Prior Publication Data

US 2024/0131613 A1 Apr. 25, 2024
US 2024/0227060 A9 Jul. 11, 2024

(30) Foreign Application Priority Data

Oct. 20, 2022 (KR) .................. 10-2022-0135951
Dec. 21, 2022 (KR) .................. 10-2022-0180588

(51) Int. Cl.
*B23K 20/10* (2006.01)
*B23K 20/26* (2006.01)

(52) U.S. Cl.
CPC .............. *B23K 20/10* (2013.01); *B23K 20/26* (2013.01)

(58) Field of Classification Search
CPC ................................. B23K 20/26; B23K 20/10
See application file for complete search history.

(56) References Cited

FOREIGN PATENT DOCUMENTS

| JP | 2011-020177 A | 2/2011 |
|---|---|---|
| KR | 1999-0053454 A | 7/1999 |
| KR | 10-0837734 B1 | 2/2008 |
| KR | 10-1135335 B1 | 9/2010 |
| KR | 10-2013-0104292 A | 9/2013 |
| KR | 10-2457039 B1 | 7/2019 |

OTHER PUBLICATIONS

Machine translation of KR-10-2013-0104292 A; Publication date: Sep. 25, 2013; Inventor: Tae Jae Lee.*
Machine translation of JP 201102017 A; Publication date: Feb. 3, 2011; Inventor: Nakai Seiya.*
Korean Office Action dated Sep. 13, 2024 issued in Korean Patent Application No. 10-2022-0180588.

* cited by examiner

*Primary Examiner* — Vishal I Patel
(74) *Attorney, Agent, or Firm* — Harness, Dickey & Pierce, P.L.C.

(57) ABSTRACT

Disclosed is a dual heating type ultrasonic bonding apparatus including a stage, a part seating jig disposed on the stage, and an ultrasonic bonding unit disposed to correspond to the part seating jig and that bonds dissimilar parts seated on the part seating jig. The stage includes a first heater that transfers heat to the dissimilar parts through the part seating jig, and the ultrasonic bonding unit includes an ultrasonic horn that applies ultrasonic waves to the dissimilar parts, and a second heater coupled to the ultrasonic horn, and that transfers heat to the dissimilar parts through the ultrasonic horn.

3 Claims, 8 Drawing Sheets

DUAL TYPE ULTRASONIC BONDING APPARATUS AND BONDING METHOD USING THE SAME

CROSS-REFERENCE TO RELATED APPLICATIONS

This application claims priority under 35 U.S.C. § 119 to Korean Patent Application No. 10-2022-0135951 filed on Oct. 20, 2022, and Korean Patent Application No. 10-2022-0180588 filed on Dec. 21, 2022, in the Korean Intellectual Property Office, the disclosures of which are incorporated by reference herein in their entireties.

BACKGROUND

Embodiments of the present disclosure described herein relate to a dual type ultrasonic bonding apparatus and a bonding method using the same.

A general ultrasonic welding method is a method of disposing welding targets, which are to be attached, between an ultrasonic horn of 19 kHz and a stage, and bonding the welding targets using frictions of ultrasonic vibrations. Meanwhile, in an ultrasonic welding process, there is a possibility of damage to the welding targets (circuits or insulating layers). Due to the possibility of damage to the welding targets, it may be difficult to apply the ultrasonic bonding method to a thin copper film circuit of 20 μm or less, and a PI layer used as the insulating layer may be damaged.

A thermal bonding (a hot bar, thermal fusion, and the like) using heat is a method of applying heat of 400° C. or more to melt general lead, increasing a time period, for which heat is applied, or performing bonding by adding fluxes. The thermal bonding method may damage the insulating layer with the applied heat.

In the ultrasonic bonding method and the thermal bonding method, which have been described above, cold lead may be generated when ultrasonic waves are reduced to prevent damage to the insulating layer or temperature is lowered.

SUMMARY

Embodiments of the present disclosure provide a dual heating type ultrasonic bonding apparatus that shortens a bonding time for dissimilar parts by applying heat together with ultrasonic waves to upper and lower portions of dissimilar parts and prevents damage to the dissimilar parts, and a bonding method using the same.

According to an aspect of the present disclosure, a dual heating type ultrasonic bonding apparatus includes a stage, a part seating jig disposed on the stage, and an ultrasonic bonding unit disposed to correspond to the part seating jig and that bonds dissimilar parts seated on the part seating jig, the stage includes a first heater that transfers heat to the dissimilar parts through the part seating jig, and the ultrasonic bonding unit includes an ultrasonic horn that applies ultrasonic waves to the dissimilar parts, and a second heater coupled to the ultrasonic horn, and that transfers heat to the dissimilar parts through the ultrasonic horn.

In an embodiment of the present disclosure, a first recess, in which the part seating jig is seated, may be provided at an upper portion of the stage, and the first heater may be provided at a lower portion of the first recess.

In an embodiment of the present disclosure, a second recess, in which the dissimilar parts are seated, may be provided at an upper portion of the part seating jig, and a protrusion coupled to the first recess be provided at a lower portion of the part seating jig.

In an embodiment of the present disclosure, the ultrasonic bonding unit may further include an ultrasonic oscillator provided at an upper portion of the ultrasonic horn, and that generates an electrical signal, a converter disposed between the ultrasonic oscillator and the ultrasonic horn, and that generates ultrasonic waves based on the electrical signal, and a height adjustor connected to the converter and that adjusts a height of the ultrasonic horn.

In an embodiment of the present disclosure, the ultrasonic horn may be lowered by the height adjustor to apply a pressure to the dissimilar parts.

According to another aspect of the present disclosure, a bonding method for bonding dissimilar parts by using a dual heating type ultrasonic bonding apparatus including a stage, a part seating jig, and an ultrasonic bonding unit includes disposing the part seating jig on the stage including a first heater, seating the dissimilar parts on the part seating jig, disposing an ultrasonic horn of the ultrasonic bonding unit such that the ultrasonic horn of the ultrasonic bonding unit corresponds to the part seating jig, and bonding the dissimilar parts by using the ultrasonic horn, in the bonding of the dissimilar parts, the ultrasonic horn is lowered to apply the ultrasonic waves and a pressure to the dissimilar parts, wherein heat of the first heater is applied to the dissimilar parts through the part seating jig, and heat of a second heater coupled to the ultrasonic horn is applied to the dissimilar parts through the ultrasonic horn.

In an embodiment of the present disclosure, the bonding method may further include heating the part seating jig by using the first heater of the stage before the seating of the dissimilar parts on the part seating jig.

In an embodiment of the present disclosure, the bonding method may further include heating the ultrasonic horn by using the second heater before the bonding of the dissimilar parts by using the ultrasonic horn.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
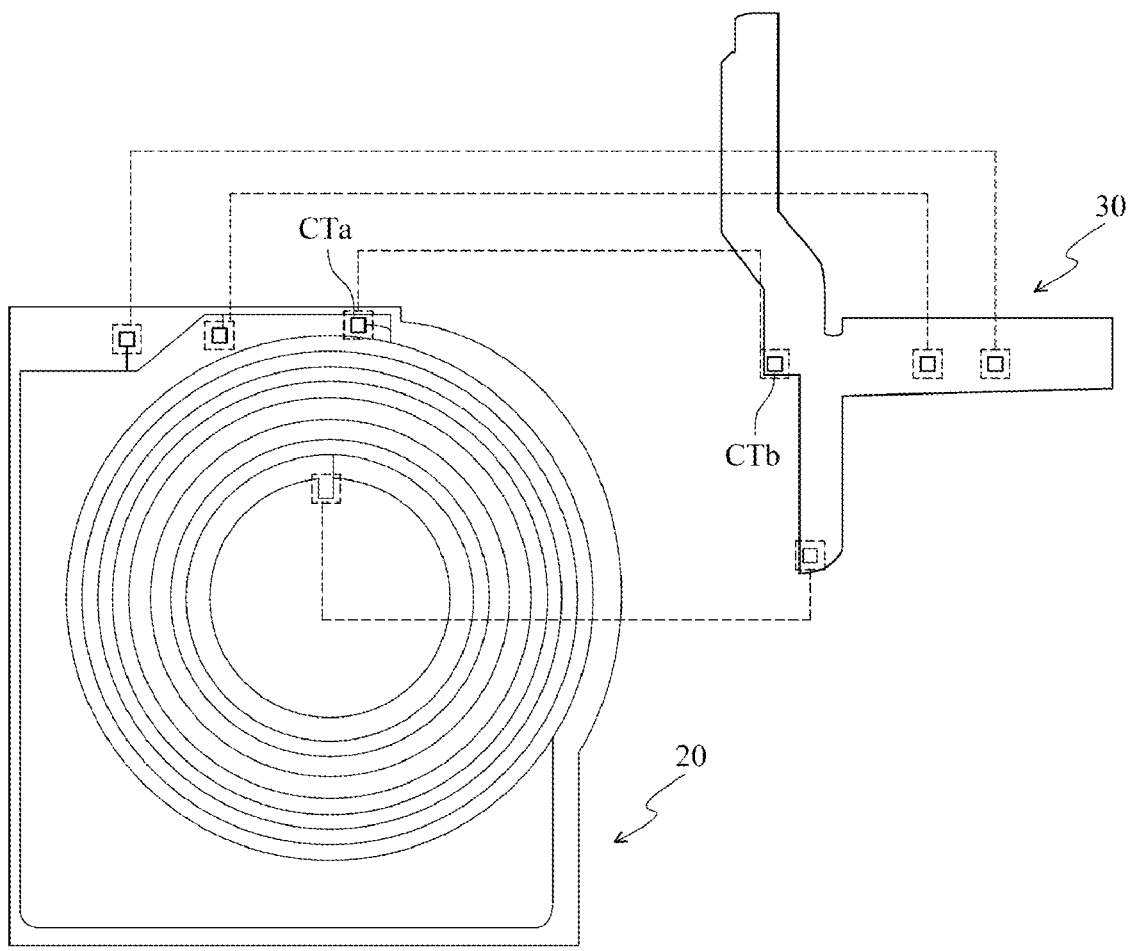
FIG. 1 is a view illustrating dissimilar parts that may be bonded to each other by using a bonding apparatus.

The objectives, the specific advantages, and new features of the present disclosure will become clear from the following description and the preferred embodiments associated with the accompanying drawings. Throughout the specification, it is noted that the same or like reference numerals denote the same or like components even though they are provided in different drawings. Furthermore, in a description of the present disclosure, a detailed description of related known technologies may be omitted when it may make the essence of the present disclosure unnecessarily unclear.

Further, the accompanying drawings are provided only to help understand the embodiments disclosed in the specification more easily but the technical spirit disclosed in the specification is not limited by the accompanying drawings and it construed to include all changes, equivalents, and replacements included in the spirit and technical range of the present disclosure.

Furthermore, the terms including ordinal numbers, such as first and second, may be used to describe various components, but the components are not limited to the terms. The terms are used only for the purpose of distinguishing one component from another component.

Hereinafter, preferred embodiments of the present disclosure will be described in detail with reference to the accompanying drawings.

Figure 2:
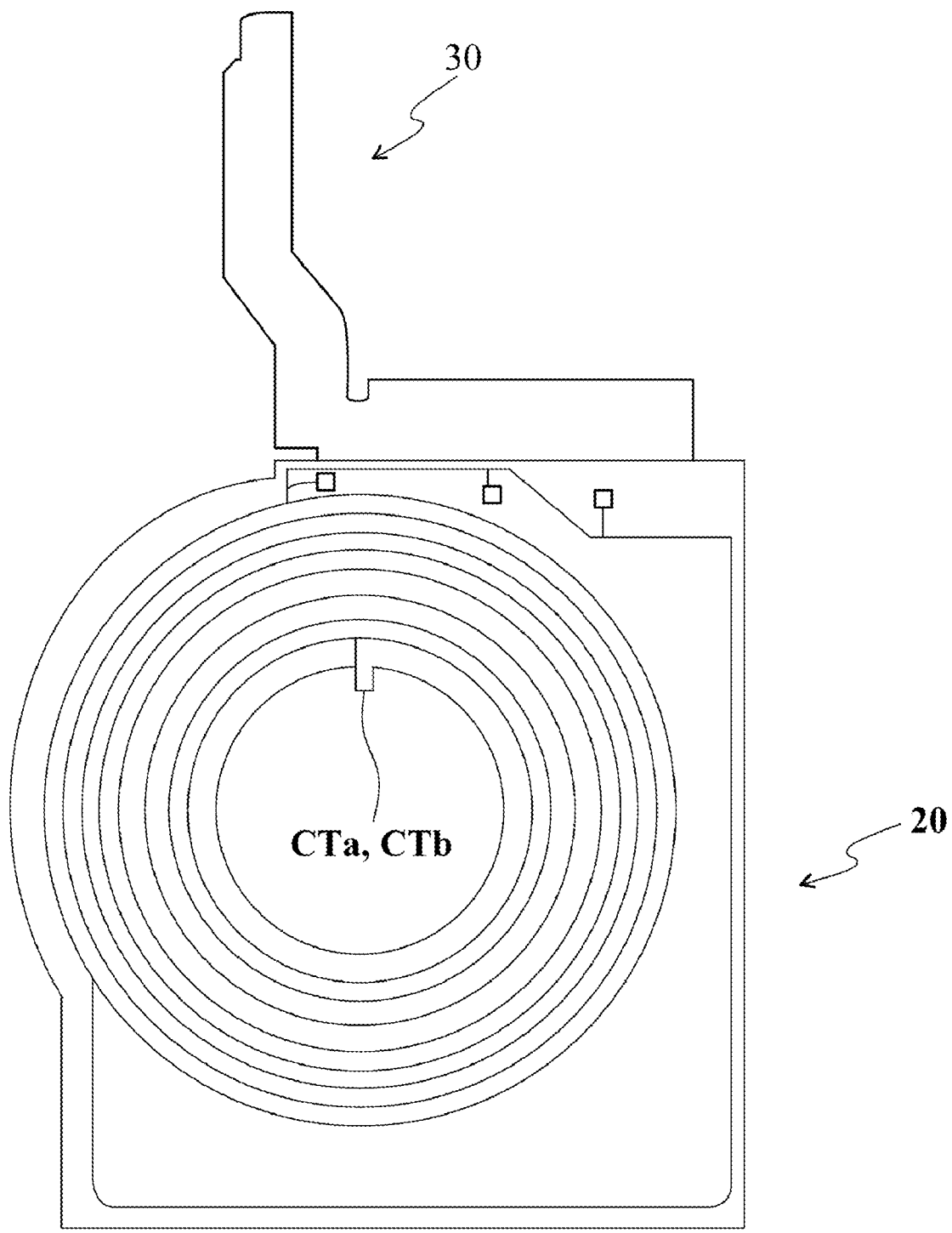
FIG. 2 is a view illustrating a state, in which dissimilar parts are bonded to each other by using a bonding apparatus.

FIG. 1 is a view illustrating dissimilar parts that may be bonded to each other by using a bonding apparatus. FIG. 2 is a view illustrating a state, in which dissimilar parts are bonded to each other by using the bonding apparatus.

Referring to FIGS. 1 and 2, the dissimilar parts may include a circuit board 20 and a flexible printed circuit board 30 connected to the circuit board 20, and the circuit board 20 and the flexible printed circuit board 30 may be bonded to each other through a dual heating type ultrasonic bonding apparatus according to an embodiment of the present disclosure, which will be described later.

Meanwhile, although the circuit board 20 and the flexible printed circuit board 30 have been described above as examples of the dissimilar parts, the present disclosure is not limited thereto. For example, the dissimilar parts may be the circuit board 20 and a lead frame. Furthermore, the dissimilar parts may be an electronic element and the circuit board 20.

The circuit board 20 may include at least one of coils of a wireless charging device, a magnetic security transmission (MST), or near field communication (NFC), and wiring lines connected thereto. Another component, for example, a contact part CTa connected to the flexible printed circuit board 30 may be provided to an end of a wiring line.

The flexible printed circuit board 30 is bonded and connected to the circuit board 20, and may include a wiring line. A contact part CTb corresponding to the contact part CTa of the circuit board 20 may be provided on the flexible printed circuit board 30. Electric power may be provided to the circuit board 20 through a wiring line, and signals may be transmitted and received. The contact parts CTa and CTb included in the circuit board 20 and the flexible printed circuit board 30 may be bonded to each other.

The contact parts CTa and CTb may be bonded to each other by using a soldering process to be electrically connected to each other. Meanwhile, although it has been described in an embodiment of the present disclosure that the contact parts CTa and CTb are connected to each other through a soldering process, the present disclosure is not limited thereto. For example, the contact parts CTa and CTb may be directly bonded to each other through the dual heating type ultrasonic bonding apparatus according to an embodiment of the present disclosure to be electrically connected to each other. Furthermore, the contact parts CTa and CTb may be electrically connected to each other by disposing an anisotropic conductive film (ACF) between the contact parts CTa and CTb and applying heat, ultrasonic waves, and a pressure thereto by using the dual heating type ultrasonic bonding apparatus according to an embodiment of the present disclosure. Furthermore, a conductive bump, such as a solder bump, may be provided in advance in one of the contact parts CTa and CTb of the circuit board 20 and the flexible printed circuit board 30, and the contact parts CTa and CTb may be electrically connected to each other by applying heat, ultrasonic waves, and a pressure by using the dual heating type ultrasonic bonding apparatus according to an embodiment of the present disclosure.

Hereinafter, referring to FIG. 3, the dual heating type ultrasonic bonding apparatus that may bond the dissimilar parts will be described.

Figure 3:
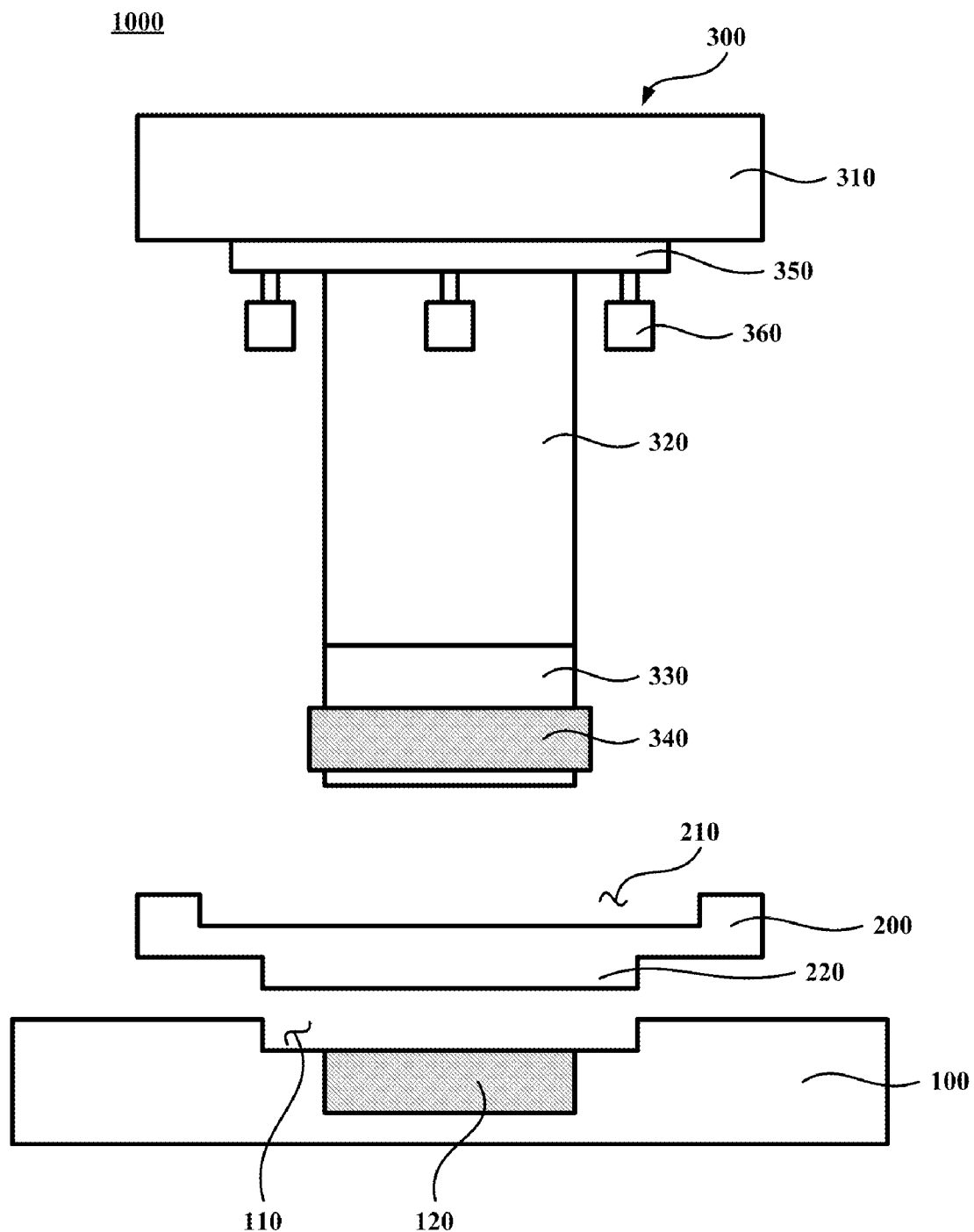
FIG. 3 is a view illustrating a dual heating type ultrasonic bonding apparatus according to an embodiment of the present disclosure.

FIG. 3 is a view illustrating the dual heating type ultrasonic bonding apparatus according to an embodiment of the present disclosure.

Referring to FIG. 3, a dual heating type ultrasonic bonding apparatus 1000 according to an embodiment of the present disclosure may bond the dissimilar parts by simultaneously applying heat, a pressure, and ultrasonic waves to the dissimilar parts. Accordingly, the dissimilar parts that are bonded to each other by using the dual heating type ultrasonic bonding apparatus 1000 according to an embodiment of the present disclosure may be bonded to each other in a short time with no damage.

The above-described dual heating type ultrasonic bonding apparatus 1000 may include a stage 100, a part seating jig 200, and an ultrasonic bonding unit 300.

The stage 100 may have various shapes, and may provide a horizontal surface, on which the part seating jig 200 may be disposed. The part seating jig 200 may be disposed at an upper portion of the stage 100, and the stage 100 may support the part seating jig 200.

A first recess 110, in which the part seating jig 200 may be seated, may be provided at an upper portion of the stage 100. Although it has been described in an embodiment of the present disclosure that the first recess 110 is provided in the stage 100, the present disclosure is not limited thereto. For example, a through part that passes through the stage 100 may be provided in the stage 100.

A first heater 120 may be provided at a lower portion of the first recess 110. That is, the first heater 120 may be provided to be mounted in an interior of the stage 100. The first heater 120 may heat parts seated on the part seating jig 200 by heating the part seating jig 200.

The part seating jig 200 may be seated on an upper portion of the stage 100. A second recess 210, in which the dissimilar parts that are to be bonded to each other through the dual heating type ultrasonic bonding apparatus 1000 according to an embodiment of the present disclosure may be seated, may be provided at an upper portion of the part seating jig 200.

A protrusion 220 that may be coupled to the first recess 110 of the stage 100 may be provided at a lower portion of the part seating jig 200.

The ultrasonic bonding unit 300 may be disposed to correspond to the second recess 210 of the part seating jig 200. The ultrasonic bonding unit 300 may bond the dissimilar parts that are seated on the part seating jig 200. The ultrasonic bonding unit 300 may bond the dissimilar parts by simultaneously applying a pressure, ultrasonic waves, and heat to the dissimilar parts.

The above-described ultrasonic bonding unit 300 may include an ultrasonic oscillator 310, a converter 320, an ultrasonic horn 330, and a second heater 340.

The ultrasonic oscillator 310 may be electrically connected to the converter 320, and may generate an electrical signal for generating ultrasonic waves. The ultrasonic oscillator 310 may generate various electrical signals according to preset frequencies of ultrasonic waves, and may transmit the electrical signals to the converter 320.

The converter 320 may be electrically connected to the ultrasonic oscillator 310, and may generate ultrasonic waves having the preset frequencies based on the electrical signals generated by the ultrasonic oscillator 310. One end of the converter 320 may be connected to one end of the ultrasonic oscillator 310, and an opposite end of the converter 320 may be connected to the ultrasonic horn 330.

The converter 320 may include a booster (not illustrated) that increases or decreases vibrational energy due to the generated ultrasonic waves according to a processing ratio.

The ultrasonic horn 330 may be connected to an opposite end of the converter 320, and may deliver vibrations of the ultrasonic waves generated by the converter 320 to the dissimilar parts that are bonding targets.

The ultrasonic horn 330 may have various shapes according to shapes of the circuit board 20 and the flexible printed circuit board 30. For example, a surface of the ultrasonic horn 330, which contacts the dissimilar parts, may have a shape corresponding to an area of the circuit board 20. Furthermore, the surface of the ultrasonic horn 330, which contacts the dissimilar parts, may have a shape corresponding to a bonding portion of the circuit board 20 and the flexible printed circuit board 30.

An element insertion hole (not illustrated), into which an electronic element bonded to the circuit board 20 may be inserted by a specific depth, may be formed on a surface of the ultrasonic horn 330, which contacts the dissimilar parts. The element insertion hole may have a shape corresponding to a shape of the electronic element, and a depth of the element insertion hole may be a height or a thickness of the electronic element or more.

The second heater 340 may be coupled to a lower end of the ultrasonic horn 330, and may heat the ultrasonic horn 330. Here, the second heater 340 may heat the ultrasonic horn 330 at a preset temperature. The preset temperature may be a high temperature, for example, a temperature of 400° C. or less. Furthermore, the preset temperature may be changed according to kinds and bonding conditions of the circuit board 20, the flexible printed circuit board 30, or the electronic element. The ultrasonic horn 330 heated by the second heater 340 may apply a pressure, ultrasonic waves, and heat to the dissimilar parts.

In an embodiment of the present disclosure, the ultrasonic bonding unit 300 may further include a height adjustor 350 and a leveler 360.

The height adjustor 350 may be coupled to one end of the converter 320, and may adjust the heights of the converter 320 and the ultrasonic horn 330. For example, the height adjustor 350 may be connected to the converter 320 through a ball screw scheme, and may adjust a height of the converter 320. As the height of the converter 320 is adjusted by the height adjustor 350, a height of the ultrasonic horn 330 connected to an opposite end of the converter 320 may be adjusted.

In an embodiment of the present disclosure, a height adjusting screw (not illustrated) may be additionally included between the height adjustor 350 and the ultrasonic horn 330. One end of the height adjusting screw may be connected to the ultrasonic horn 330, and an opposite end of the height adjusting screw may be connected to the height adjustor 350.

A height of the height adjusting screw may be adjusted according to driving of the height adjustor 350, and a height of the ultrasonic horn 330 may be adjusted by adjusting the height of the height adjusting screw.

The height adjustor 350 is not limited to the above-described embodiments, and may be implemented by various means that may adjust the height of the ultrasonic horn 330.

The leveler 360 may be connected to one surface of the height adjustor 350, and may adjust a horizontality of the ultrasonic horn 330.

At least one leveler 360 may be provided. When a plurality of levelers 360 are provided, the levelers 360 may be disposed to correspond to a plurality of divided areas when one end of the converter 320 is viewed on a plane, and the levelers 360 may adjust heights of corresponding ones of the plurality of areas. As the levelers 360 adjust the heights of the areas, a horizontality of the converter 320 and/or the ultrasonic horn 330 may be adjusted.

Meanwhile, the levelers 360 are not limited to the above-described example, and may be implemented by various configurations that may adjust the horizontality of the ultrasonic horn 330.

Furthermore, although not illustrated in the drawings, a power supplier (not illustrated) for driving the ultrasonic bonding unit 300 may be additionally included. The power supplier may supply electric power to the ultrasonic oscillator 310, the converter 320, the first heater 120, the second heater 340, the height adjustor 350, and the leveler that require electric power.

The above-described dual heating type ultrasonic bonding apparatus 100 according to an embodiment may expedite bonding of the dissimilar parts and enhance a bonding force at the same time by applying a pressure and heat together with ultrasonic waves to the dissimilar parts. Furthermore, a preheating time for the dissimilar parts may be shortened by applying heat to upper and lower portions of the dissimilar parts by using the first heater 120 and the second heater 340.

As described above, because the dual heating type ultrasonic bonding apparatus according to an embodiment of the present disclosure expedites bonding of the dissimilar parts, times for applying a pressure, heat, and ultrasonic waves are decreased whereby damage to the dissimilar parts may be prevented.

Hereinafter, referring to FIGS. 4 to 9, a bonding method using the dual heating type ultrasonic bonding apparatus that may bond the dissimilar parts will be described.

Figure 4:
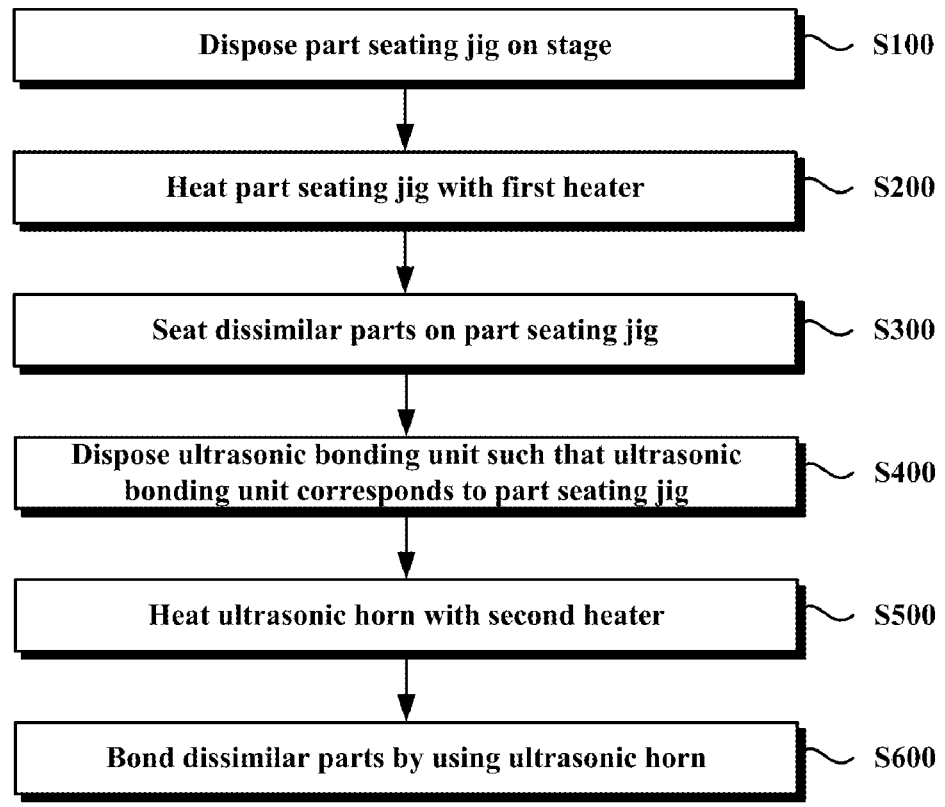
FIG. 4 is a flowchart illustrating a bonding method for dissimilar parts using the dual heating type ultrasonic bonding apparatus illustrated in FIG. 3.

FIG. 4 is a flowchart illustrating a bonding method for dissimilar parts using the dual heating type ultrasonic bonding apparatus illustrated in FIG. 3. FIGS. 5 to 9 are views illustrating operations of the bonding method for the dissimilar parts.

Referring to FIGS. 4 to 9, the bonding method for the dissimilar parts according to an embodiment of the present disclosure may be performed by using the dual heating type ultrasonic bonding apparatus 1000 illustrated in FIG. 3.

The bonding method for the dissimilar parts, as illustrated in FIG. 4, includes an operation S100 of disposing a part seating jig on a stage, an operation S200 of heating the part seating jig with a first heater, an operation S300 of seating dissimilar parts on the part seating jig, an operation S400 of disposing an ultrasonic bonding unit such that the ultrasonic bonding unit corresponds to the part seating jig, an operation S500 of heating an ultrasonic horn with a second heater, and an operation S600 of bonding the dissimilar parts by using the ultrasonic horn to bond the dissimilar parts, and thus, the dissimilar parts may be electrically connected to each other.

Figure 5:
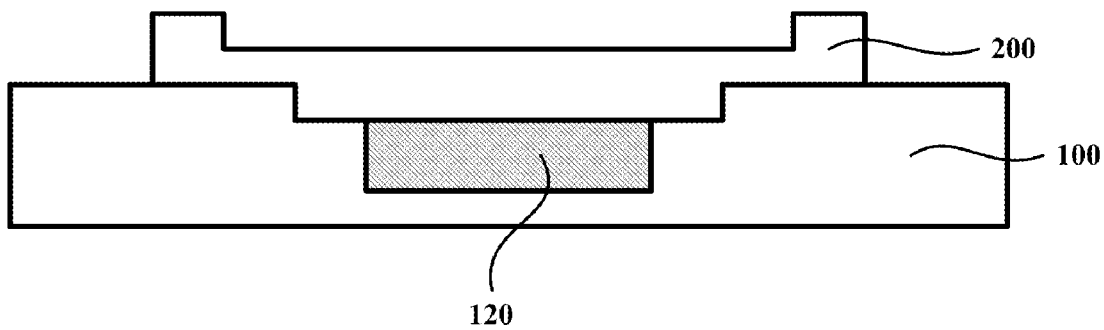
FIGS. 5 to 9 are views illustrating operations of a bonding method for dissimilar parts.

In the operation S100 of disposing the part seating jig on the stage, as illustrated in FIG. 5, the protrusion of the part seating jig 200 may be coupled to the first recess 110 of the stage 100 such that the part seating jig 200 is seated on the stage 100.

In the operation S200 of heating the part seating jig with the first heater, after the part seating jig 200 is disposed on the stage 100, the part seating jig 200 may be heated by operating the first heater 120.

Meanwhile, although it has been described as an example that the part seating jig 200 is disposed on the stage 100 and then the part seating jig 200 is heated by the first heater 120, the present disclosure is not limited thereto. For example, as described later, after the dissimilar parts are disposed in the part seating jig 200, the part seating jig 200 may be heated by operating the first heater 120, and thus, the dissimilar parts may be heated.

Figure 6:
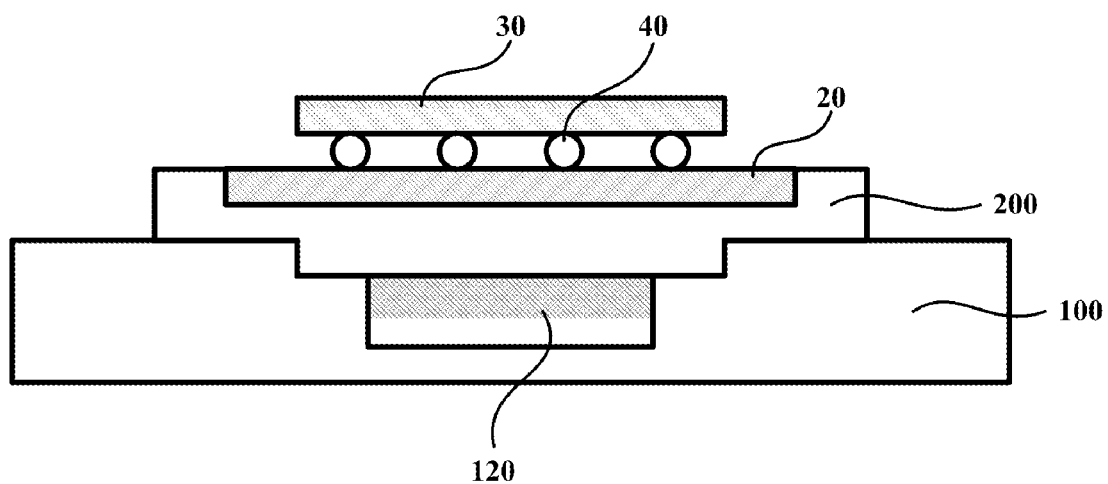

In the operation S300 of seating the dissimilar parts on the part seating jig, as illustrated in FIG. 6, the dissimilar parts may be seated in the second recess 210 of the part seating jig 200. Here, the dissimilar parts may be the circuit board 20 and the flexible printed circuit board 30, and the circuit board 20 and the flexible printed circuit board 30 may be disposed while being vertically stacked. Furthermore, a connection member 40, such as a solder ball or solder paste, may be disposed between the circuit board 20 and the flexible printed circuit board 30.

The dissimilar parts seated in the second recess 210 of the part seating jig 200, in particular, the circuit board 20 disposed on a lower side thereof may be heated by the heat supplied from the first heater 120 through the part seating jig 200.

Figure 7:
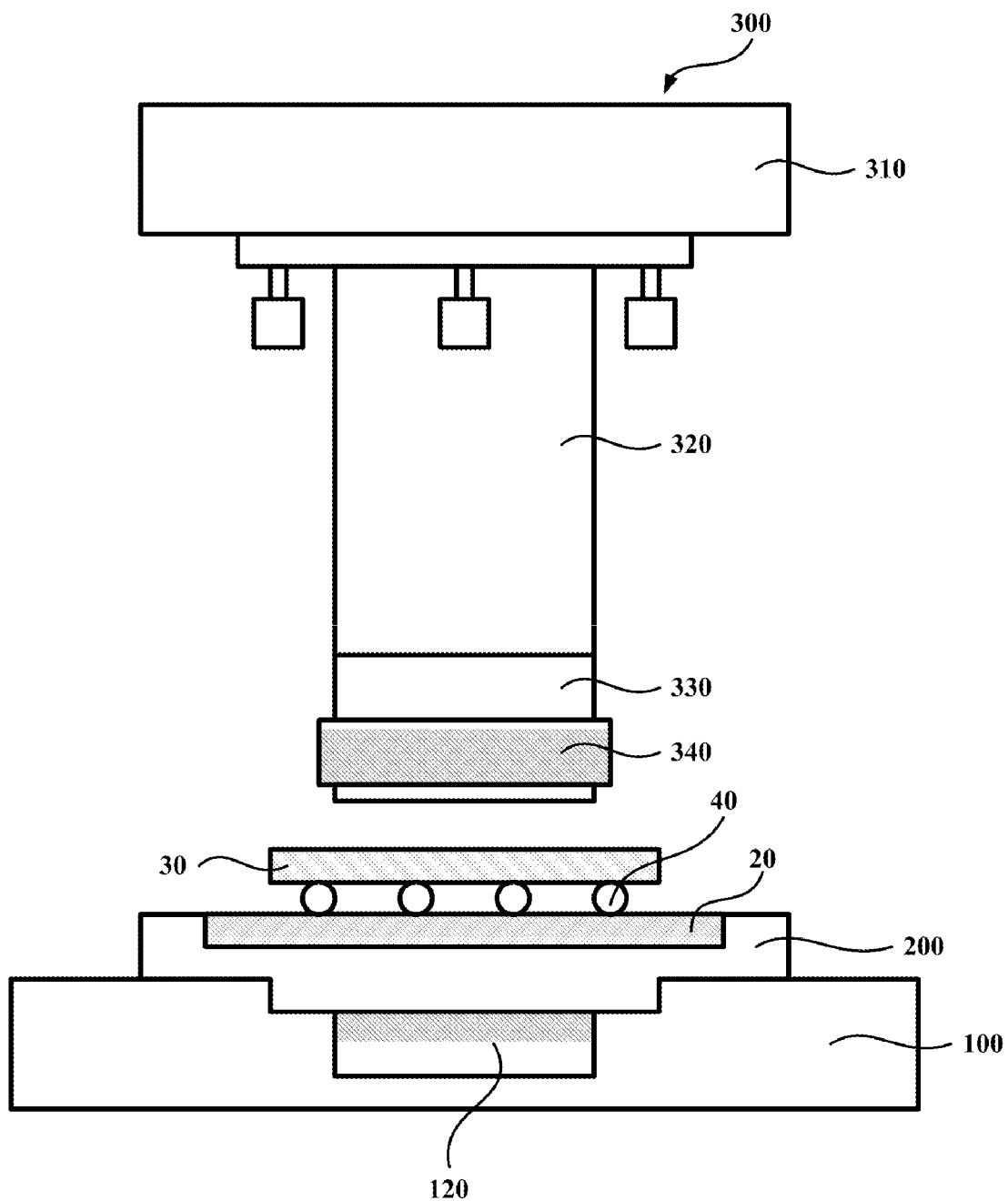

In the operation S400 of disposing the ultrasonic bonding unit such that the ultrasonic bonding unit corresponds to the part seating jig, as illustrated in FIG. 7, the ultrasonic bonding unit 300 may be disposed to correspond to the part seating jig 200. In particular, the ultrasonic horn 330 of the ultrasonic bonding unit 300 may be disposed to correspond to the dissimilar parts.

In the operation S500 of heating the ultrasonic horn with the second heater, after the ultrasonic bonding unit 300 is disposed to correspond to the part seating jig 200, the ultrasonic horn 330 may be heated by operating the second heater 340.

Meanwhile, although it has been described as an example that the ultrasonic horn 330 is heated by the second heater 340 after the ultrasonic bonding unit 300 is disposed to correspond to the part seating jig 200, the present disclosure is not limited thereto. For example, as described later, the ultrasonic horn 330 may be heated by operating the second heater 340 in a process of bonding the dissimilar parts by using the ultrasonic horn 330, and thus, the dissimilar parts may be heated.

Figure 8:
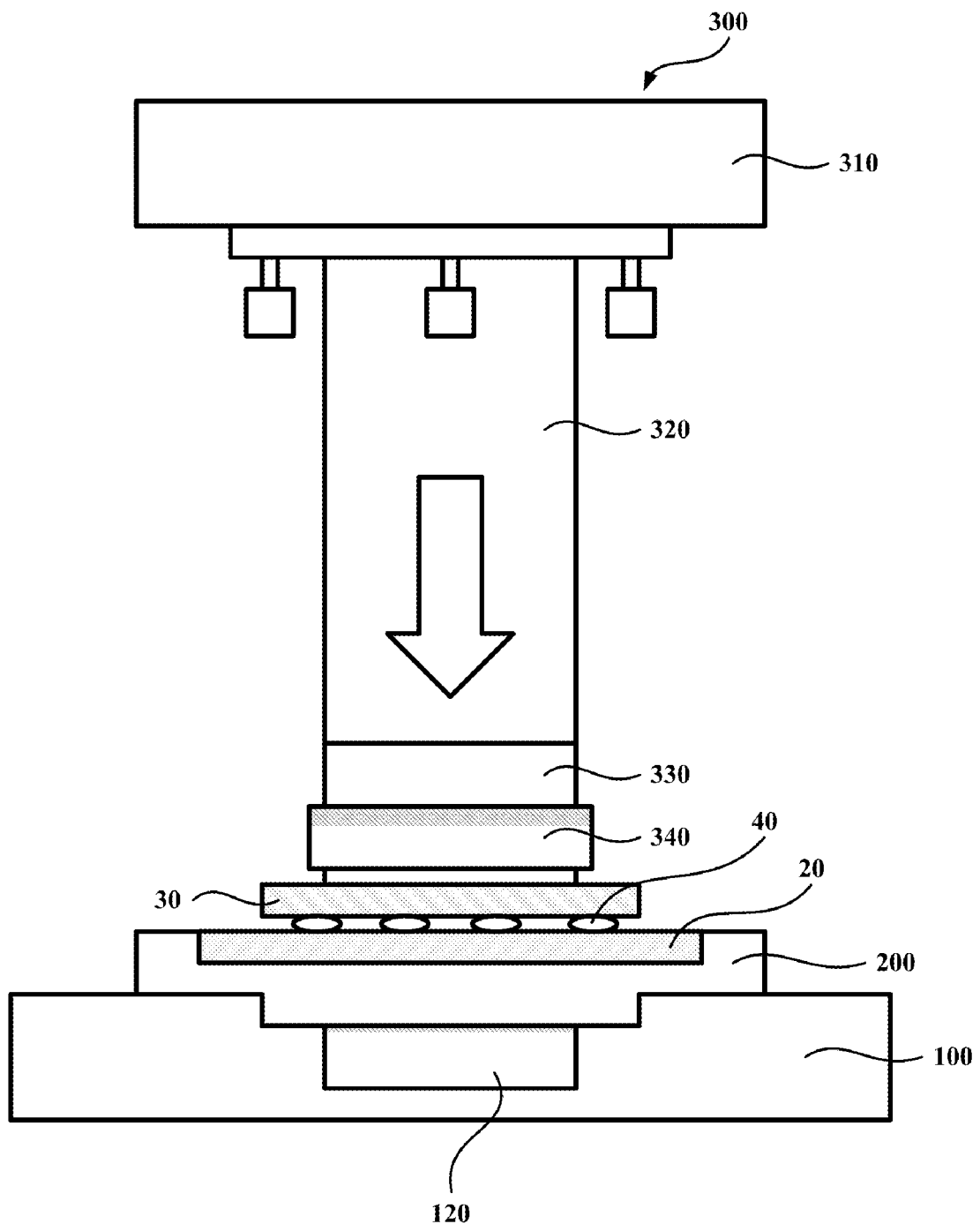

In the operation S600 of bonding the dissimilar parts by using the ultrasonic horn, as illustrated in FIG. 8, the dissimilar parts may be bonded by using the ultrasonic horn 330 when the ultrasonic horn 330 is heated. Hereinafter, bonding of the dissimilar parts using the ultrasonic horn 330 will be described in more detail.

First, a pressure may be applied to one of the ultrasonic horn 330 and the dissimilar parts, which is disposed on an upper side, for example, the flexible printed circuit board 30 by lowering the ultrasonic horn 330 of the ultrasonic bonding unit 300. Here, the heat generated by the second heater 340 together with the pressure may be delivered to the flexible printed circuit board 30 through the ultrasonic horn 330. Accordingly, the flexible printed circuit board 30 may be preheated. Here, the ultrasonic horn 330 may be lowered by using the height adjustor 350. Furthermore, a pressure may be applied to the dissimilar parts by lowering the ultrasonic horn 330.

Thereafter, the ultrasonic oscillator 310 may generate an electrical signal for generating ultrasonic waves, and may transmit the electrical signal to the converter 320. The converter 320 may generate ultrasonic waves having a preset frequency based on the received electrical signal, and the ultrasonic waves may be delivered to the dissimilar parts through the ultrasonic horn 330.

As described above, heat generated by the first heater 120 and delivered through the part seating jig 200, heat generated by the second heater 340 and delivered through the ultrasonic horn 330, a pressure due to lowering of the ultrasonic bonding unit 300, and ultrasonic waves generated by the converter 320 and delivered through the ultrasonic horn 330 may be simultaneously applied to the dissimilar parts.

Figure 9:
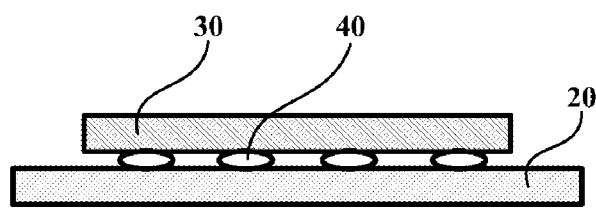

As the heat, the pressure, and the ultrasonic waves are applied simultaneously, the connection member 40, such as the solder ball or the solder paste, may bond the dissimilar parts in a short time. Furthermore, as illustrated in FIG. 9, a shape of the connection member 40 may be changed in a form of being pressed by the heat, the pressure, and the ultrasonic waves.

The bonding method for the dissimilar parts by using the above-described dual heating type ultrasonic bonding apparatus 1000 according to an embodiment may expedite bonding of the dissimilar parts and enhance a bonding force at the same time by applying a pressure and heat together with ultrasonic waves to the dissimilar parts. Furthermore, a preheating time for the dissimilar parts may be shortened by applying heat to upper and lower portions of the dissimilar parts by using the first heater 120 and the second heater 340.

As described above, because the bonding method for the dissimilar parts by using the dual heating type ultrasonic bonding apparatus 1000 according to an embodiment of the present disclosure expedites bonding of the dissimilar parts, times for applying a pressure, heat, and ultrasonic waves are decreased whereby damage to the dissimilar parts may be prevented.

According to the dual heating type ultrasonic bonding apparatus and the bonding method using the same according to the present disclosure, bonding of the dissimilar parts may be expedited and a bonding force may be enhanced by applying heat together with ultrasonic waves to the upper and lower portions of the dissimilar parts.

Furthermore, according to the dual heating type ultrasonic bonding apparatus and the bonding method using the same according to the present disclosure, because times for applying a pressure, heat, and ultrasonic waves are reduced, damage to the dissimilar parts may be prevented.

The present disclosure is not limited to the above-described embodiments, and it is apparent that a combination of two or more of the embodiments or a combination of at least one of the embodiments and a known technology is included as a new embodiment.

Until now, although the present disclosure has been described in detail through the detailed embodiment, the embodiment is for describing the present disclosure in detail, and the present disclosure is not limited thereto but may be modified or improved by an ordinary person in the art, to which the present disclosure pertains, without departing from the technical spirit of the present disclosure.

Simple modifications or changes of the present disclosure pertain to the areas of the present disclosure, and thus the protection scope of the present disclosure will become clearer by the attached claims.

What is claimed is:

1. A dual heating type ultrasonic bonding apparatus comprising:
   a stage;
   a part seating jig on the stage; and
   an ultrasonic bonding unit disposed to correspond to the part seating jig and configured to bond dissimilar parts seated on the part seating jig,
   wherein the stage includes a first heater configured to transfer heat to the dissimilar parts through the part seating jig,
   wherein an upper portion of the stage includes a first recess, in which the part seating jig is to be seated,
   wherein the first heater is at a lower portion of the first recess,
   wherein the part seating jig includes a protrusion at a lower portion thereof, the protrusion configured to be coupled to the first recess,
   wherein an upper portion of the part seating jig includes a second recess, in which the dissimilar parts are to be seated, and
   wherein the ultrasonic bonding unit includes
      an ultrasonic horn configured to apply ultrasonic waves to the dissimilar parts, and
      a second heater coupled to the ultrasonic horn, and configured to transfer heat to the dissimilar parts through the ultrasonic horn.

2. The dual heating type ultrasonic bonding apparatus of claim 1, wherein the ultrasonic bonding unit further includes:
   an ultrasonic oscillator provided at an upper portion of the ultrasonic horn, and configured to generate an electrical signal;
   a converter disposed between the ultrasonic oscillator and the ultrasonic horn, and configured to generate ultrasonic waves based on the electrical signal; and
   a height adjustor connected to the converter and configured to adjust a height of the ultrasonic horn.

3. The dual heating type ultrasonic bonding apparatus of claim 2, wherein the ultrasonic horn is lowered by the height adjustor to apply a pressure to the dissimilar parts.

* * * * *